June 27, 1939. I. C. GELLMAN Re. 21,130

WIRE FABRIC MAKING MACHINE

Original Filed Sept. 8, 1931 6 Sheets-Sheet 1

Inventor:
Israel C. Gellman.
By: Charles G. Hills Attys.

June 27, 1939. I. C. GELLMAN Re. 21,130

WIRE FABRIC MAKING MACHINE

Original Filed Sept. 8, 1931 6 Sheets-Sheet 2

INVENTOR:
Israel C. Gellman,
BY: Charles T. Hills ATTY.

June 27, 1939. I. C. GELLMAN Re. 21,130

WIRE FABRIC MAKING MACHINE

Original Filed Sept. 8, 1931 6 Sheets-Sheet 3

Inventor:
Israel C. Gellman.
By: Charles Orville Attys.

WIRE FABRIC MAKING MACHINE

Original Filed Sept. 8, 1931 6 Sheets-Sheet 4

Inventor:
Israel C. Gellman.
By: Charles O. Wills Attys.

June 27, 1939. I. C. GELLMAN Re. 21,130

WIRE FABRIC MAKING MACHINE

Original Filed Sept. 8, 1931 6 Sheets-Sheet 5

INVENTOR:
Israel C. Gellman.

BY: Charles A. Hills ATTY.

June 27, 1939. I. C. GELLMAN Re. 21,130

WIRE FABRIC MAKING MACHINE

Original Filed Sept. 8, 1931 6 Sheets-Sheet 6

INVENTOR:
Israel C. Gellman.

By: Charles H. Miller Attys.

Reissued June 27, 1939

Re. 21,130

UNITED STATES PATENT OFFICE 21,130

WIRE FABRIC MAKING MACHINE

Israel C. Gellman, Rock Island, Ill., assignor to Northwestern Steel and Wire Company, a corporation of Illinois Original No. 1,905,086, dated April 25, 1933, Serial No. 561,527, September 8, 1931. Application for reissue April 24, 1939, Serial No. 269,803

14 Claims. (Cl. 140—4)

This invention has to do with machines for making wire fabric for fences and other uses, and has particular reference to the manufacture of fabric of this character of substantially hexagon design as used for poultry netting and the like.

A principal object of this invention consists in the provision of an improved machine for fabricating a wire fence or the like embodying both line and mesh wires.

Another object of the invention resides in the provision of a machine of this character embodying rotary non-shiftable instrumentalities for weaving wire to form a fabric of substantially hexagon design.

A further object of the invention includes the provision of instrumentalities by means of which wire netting of the character referred to may be manufactured with or without line wires, without causing any change to be made in, adding to, or subtracting from the elements of the machine.

A still further object of the invention is to provide twisting mechanisms for twisting certain wires about each other in the formation of the wire fabric, in combination with weaving devices, so arranged that each weaving device cooperates with the twisting mechanism immediately following such device.

Another object of the invention contemplates the provision of alternately staggered shifting devices whereby any pair of mesh wires is alternately spread apart to be deposited in spaced apart twisting slots of one twisting mechanism and subsequently brought together to be deposited in one slot of the following twisting mechanism.

This invention contemplates as a still further object the provision of means by which escape of chips and the like from the portions of the wires being twisted by the twisting mechanism is afforded.

Another object involves a new method by which wire netting of the character mentioned may be fabricated.

Other objects and advantages of the invention will appear as the description proceeds.

This invention is of the character comprising an endless conveyor carrying an endless series of twisting mechanisms for twisting the woof or mesh wires about each other or the warp or line wires. These twisting mechanisms carry means for receiving and carrying the line wires in straight lines from the source of supply along the machine in the direction of movement of the conveyor, and means is provided for picking up the fabricated wire mesh and conducting the same to the reel upon which the same is to be wound.

In machines of this general character heretofore in use the weaving mechanism has been more or less complicated and in addition has involved movable parts of the character needing constant attention for repairs and replacement. In such machines, moreover, delays in operation have occurred from other sources, as for example, the sticking of relative movable parts due to the presence of foreign matters such as chips and the like from the wire being twisted.

According to the general features of the present invention, the disadvantages of previous constructions are overcome and novel instrumentalities are availed of for production of either a plain hexagon mesh or a combination line wire and hexagon mesh fabric. In the meshing of the wire in accordance with the present invention, there is provided a weaving or distributor head or roll for the mesh wires or strands, said roll employing a plurality of successively alternating bars carrying cam elements or teeth the teeth of each bar being aligned with the spaces between the teeth of the preceding and succeeding bar, circumferentially of the roll. The bars are circumferentially spaced in accordance with the spacing of the slotted twisting mechanisms of the continuous conveyor, the cams or teeth of each bar being so formed as to cooperate with the slots of the mechanisms following the bar whereby the cams or teeth are effective to shift the woof or mesh wires apart and together, alternately, into the corresponding slots of the twisting mechanisms, to thereby form a wire netting or fabric of substantially hexagon design. The line wires, when used, are carried parallel to one another in the slots of the twisting mechanisms, and in order that the teeth or cams on the bars may not interfere with the line wires, such teeth are provided with slots in which the line wires may be received in alignment with the slots in the twisting mechanisms. In the event that no line wires are employed in the making of wire fabric by the same machine, the aforementioned slots in the cams will not in any way interfere with the formation of the plain hexagon netting, a suitable source of supply of mesh wire independent of any supply for line wires being provided.

In order to avoid jamming of the twisting mechanisms, the latter are provided with escape means providing egress of chips and the like from the wire being twisted.

This invention (in a preferred form) is illustrated in the drawings and hereinafter more fully described.

On the drawings:

Figure 14 is a fragmentary composite view of a portion of the twisting and cooperating weaving mechanisms, the twisting mechanism being viewed from the top and the weaving mechanism up from the bottom, as will be understood upon reference to Figure 1.

Figure 1:
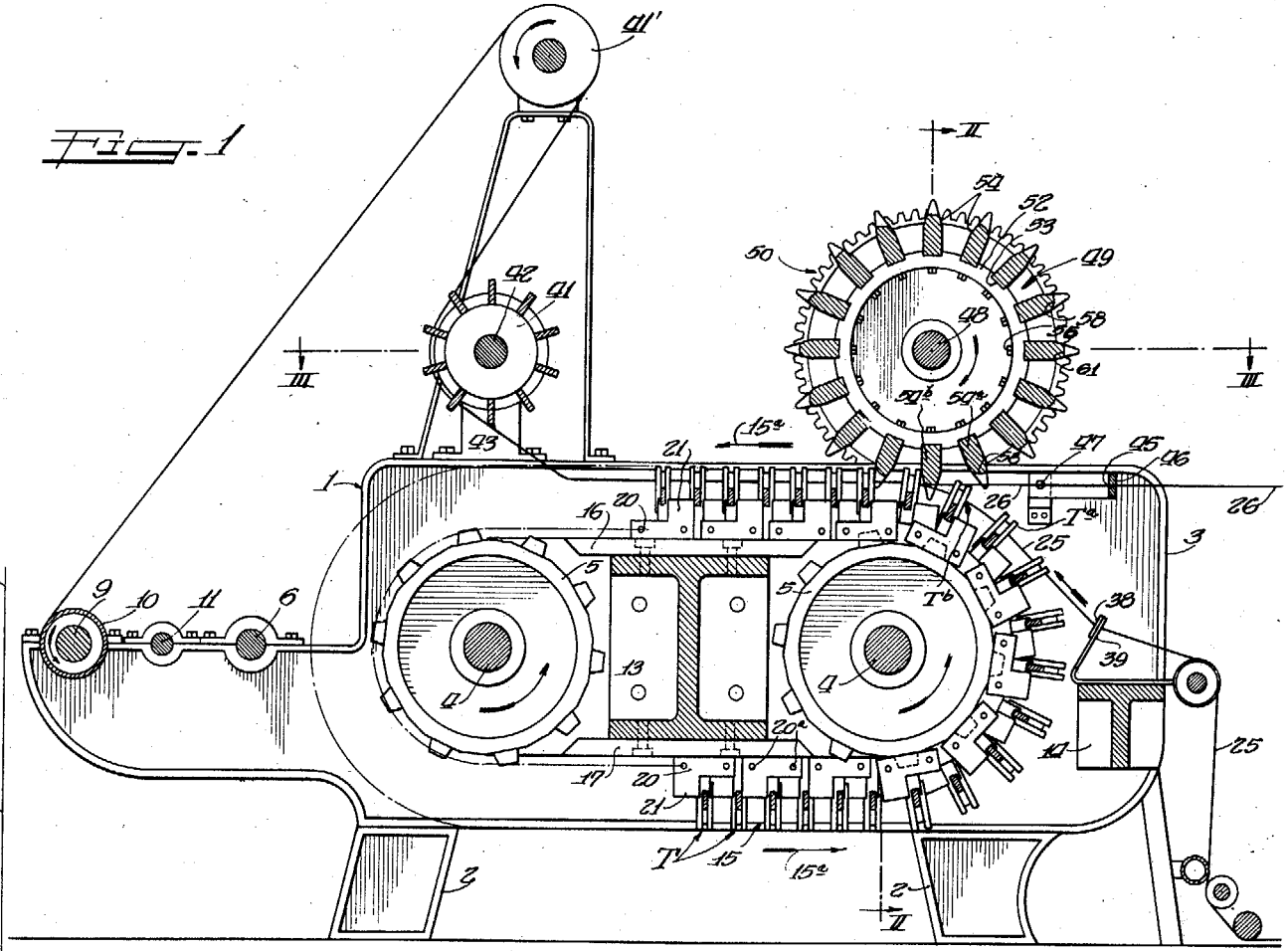
Figure 1 is a fragmentary longitudinal sectional view of a machine constructed in accordance with the present invention.
Figure 2:
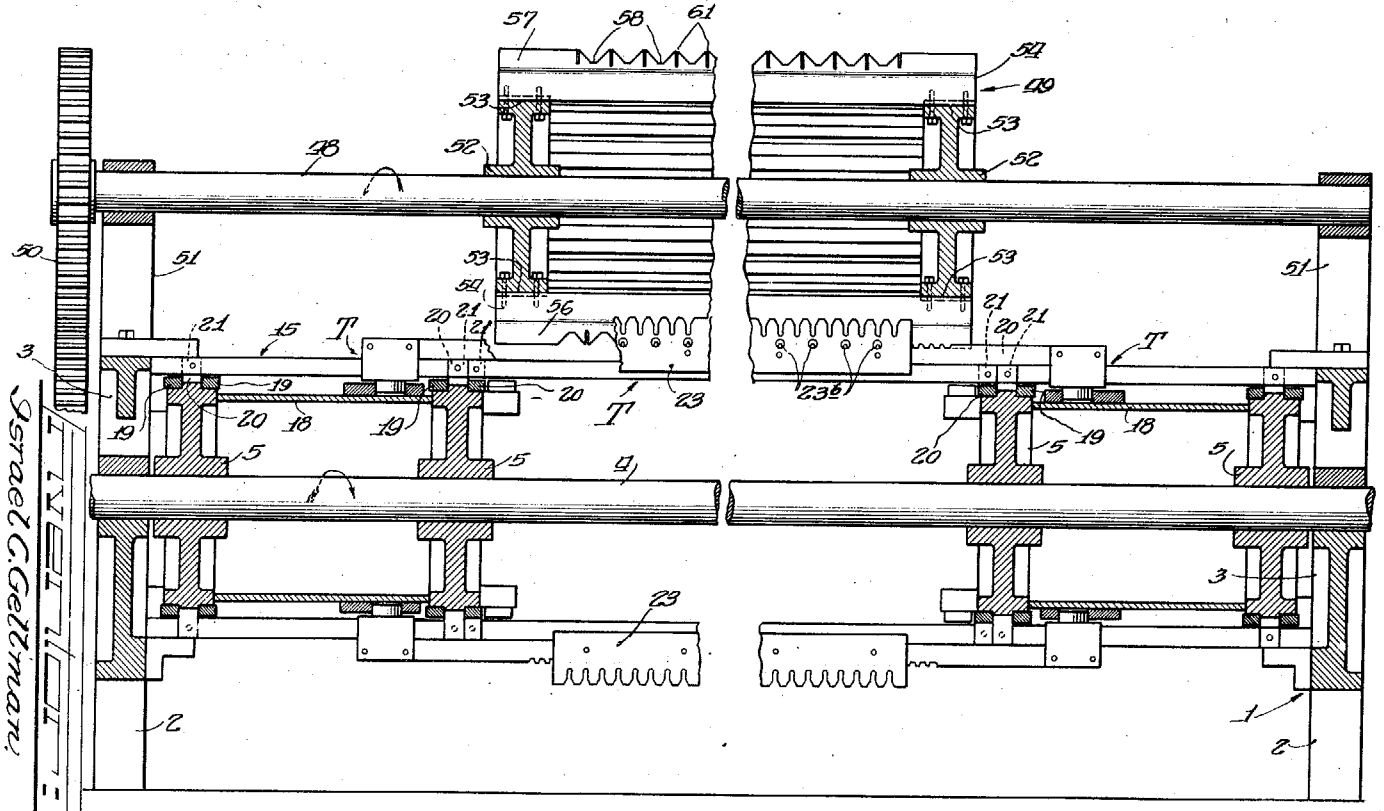
Figure 2 is a fragmentary transverse section looking toward the rear of the machine shown in Figure 1 and taken approximately as indicated by the line II—II in Figure 1.

Referring now more particularly to the drawings, wherein the same reference characters are applied to the same parts throughout, the numeral 1 indicates a frame which is carried on legs 2. The frame comprises side members 3 providing bearings for the shafts 4 carrying five end and intermediate sprockets 5. The forward shaft 4 receives power from a suitable source (not shown) and drives a shaft 6 through the medium of a chain drive 6a. The shaft 6 carries power transmitting mechanism of any suitable description such as gear 7 and 8, the gear 8 meshing with another gear (not shown) on the shaft 9 carrying the finishing reel 10 on which the fabric is wound. A bar 11 carries guide elements (not shown) for the selvages of the fabric to be wound on the finishing reel 10. A transverse frame member 13 intermediate the cross shafts 4 and a rear cross frame member 14 serve to connect and brace the side frame parts 3. An endless chain 15 is carried by the sprockets 5 and passes about stationary top, bottom and curved end plates 16, 17 and 18 respectively, in the direction indicated by the arrows 15a.

*Twisting mechanism.*—The sprocket chain consists of five sections cooperating with the five sprockets 5 on each shaft 4. Each of the outside sections comprises identical outer members 19 and inner members 20, pivoted to one another by means of pins or rivets 20a, the inner elements 20 having projecting arms or lugs 21 to which guide bars 22 are secured transversely of the machine. Each intermediate chain section, of which there are three consists of adjacent staggered link elements 19 and 20, also connected for relative pivotal movement by suitable rivets or pivot pins 20a, the outer of the elements 20 and 19 straddling the other or remaining inner elements 20. The right intermediate section of the chain has its inner link elements 20 rigidly secured by bolts 20b or the like to one series of guide bars 22, and the inner elements 20 of the left intermediate chain section are secured likewise to the other and alternate series of guide bars 22. All of the elements 20 of the central section (not shown) of the chain 15 are secured in like manner to the central portions of all of the guide bars 22.

Twister holding plates 23 are secured on opposite sides of each guide bar 22, the plates 23 extending across the central portion of the machine and being substantially coextensive with the maximum width of fence or fabric to be manufactured. The plates 23 have registering vertical slots 24 affording entry of the line or warp wires 25 and mesh or woof wires 26 of the fabric. Twisting wheels or twisters 27 are rotatably mounted in and between the plates 23 and are provided with substantially radial slots 28 normally registering with the slots 24. The walls of the slots in the plates 23 facing the opposite ends of the machine and the corresponding portions of the walls of the gear slots are flared at 23a and 27a, respectively, for a purpose to appear later in the description. Each twist gear 27 meshes with and is rotated by a rack 29 which extends transversely of the machine and between the plates 23 and slides in a longitudinal groove 30 in the upper part of each guide bar 22. The front plate 23 of each twisting mechanism T is provided with an opening 23b adapted to communicate with the slot 28 of the gear 27 at certain times during the operation of the twisting mechanism, to thereby afford a means through which chips and the like resulting from the twisting of the wires may escape. With this construction, jamming of the parts due to the presence of foreign matter is avoided.

Each rack 29 is actuated by a U-shaped member 31 which is slidably mounted on a guide bar 22 and which is secured to the rack 29 by suitable rivets or the like (not shown). A roller 32 is loosely mounted on each U-shaped member 31 and projects into one of the guideways 33, 34. One of these guideways is located near each side of the machine, as clearly seen in Figure 3, and each is formed by a pair of oppositely disposed bars 35 which are secured to the top, bottom and curved end plates 16, 17 and 18 respectively.

The guideways 33 and 34 reciprocate alternate racks simultaneously and in opposite directions, the right guideway 33 actuating the left set of racks 29 and the left guideway 34 operating the right set of racks 29. The inclined portions 36 and 37 of the guideways 33 and 34, respectively, are inclined in opposite directions. The guideways 33 and 34 are endless and it will be understood that the inclined portions 36 and 37 arranged beneath those shown in Figure 3 actuate the rollers 32 in a reverse direction to that just described and thus serve to bring the racks 29 back to their starting points and keep them thus until after the twisting wheels 27 receive the wire at the rear of the machine for fabricating the netting. The continued travel of the chain 15 causes the racks 29 to be properly actuated by the guideways 33 and 34, a more detailed description of the twisting operation appearing later herein.

For the purpose of the present illustration, arrangement is made for the formation of a fence or wire fabric of hexagon mesh, with or without the use of line wires. I shall first describe the invention when used in connection with line wires and later in connection with a fabric which does not include line wires.

In accordance with the illustrated arrangement, the twisters 27 are spaced apart in accordance with the size of mesh of the fabric to be made, the number of twisters 27 corresponding with the greatest desired number of meshes to be made. The line wires 25 are received from a suitable source (not shown) at the rear of the machine as viewed in Figures 1, 3 and 14 and, after leaving various tensioning and guide rolls, pass through openings 38 in a guide bar 39 carried by the reinforcing frame member 14 adjacent the rear of the machine, the openings 38 being arranged in the planes containing the twisters.

The line wires 25 continue forward without change in direction, resting in and carried by the bottoms of the slots 24 and 28 of the twisting mechanisms T, and are then drawn up into the grooves 40 aligned therewith in the removing or pick-up roll 41, along with the mesh wires 26 when the netting is fabricated. The roll 41 is carried by a shaft 42 journalled in the brackets 43 of the machine. The shaft 42 carries a gear 44 meshing with and driven by the gear 7 on the power transmitting shaft 6.

Figure 3:
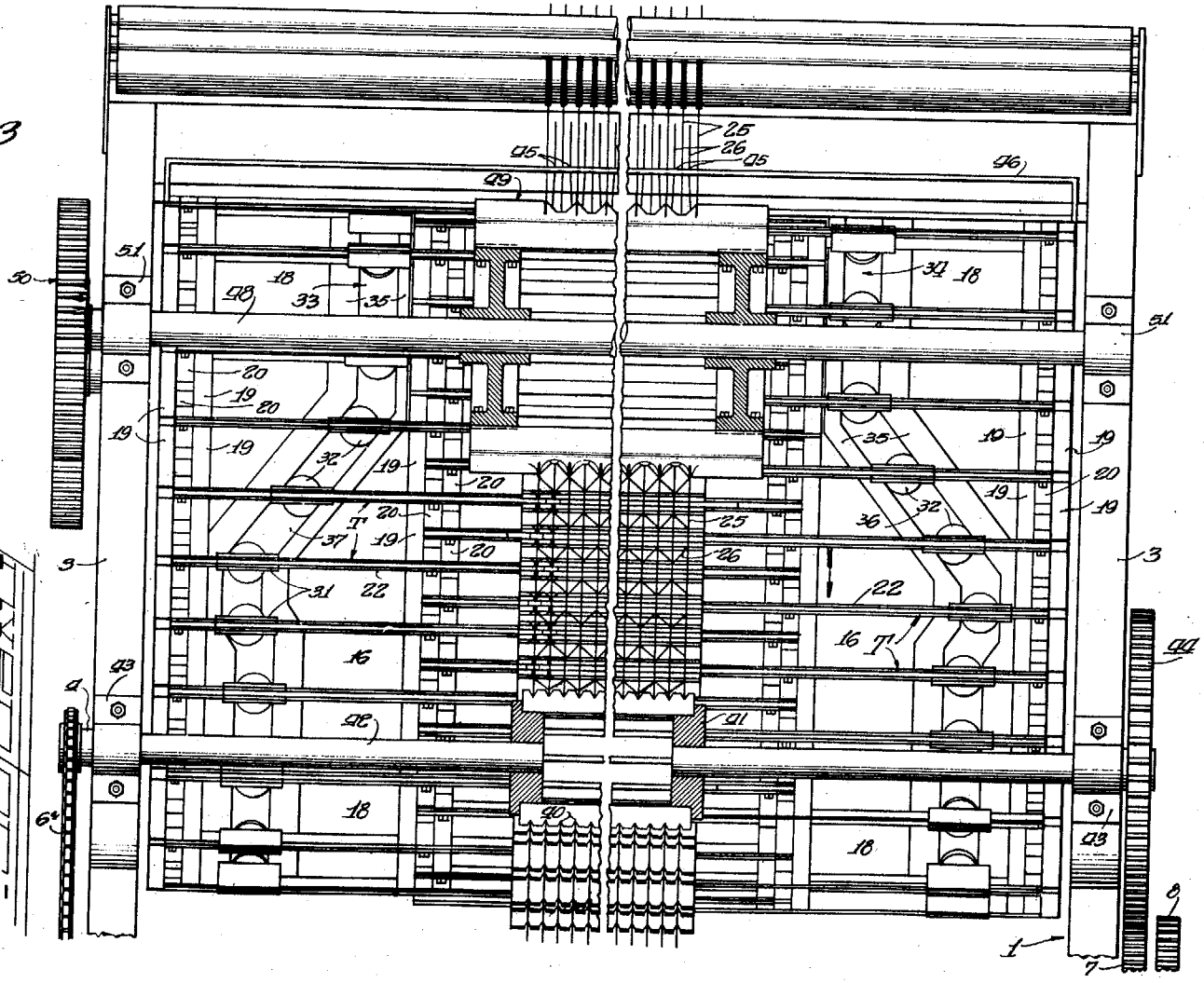
Figure 3 is a fragmentary plan view, partly in section, and taken approximately as indicated by the line III—III in Figure 1.
Figure 4:
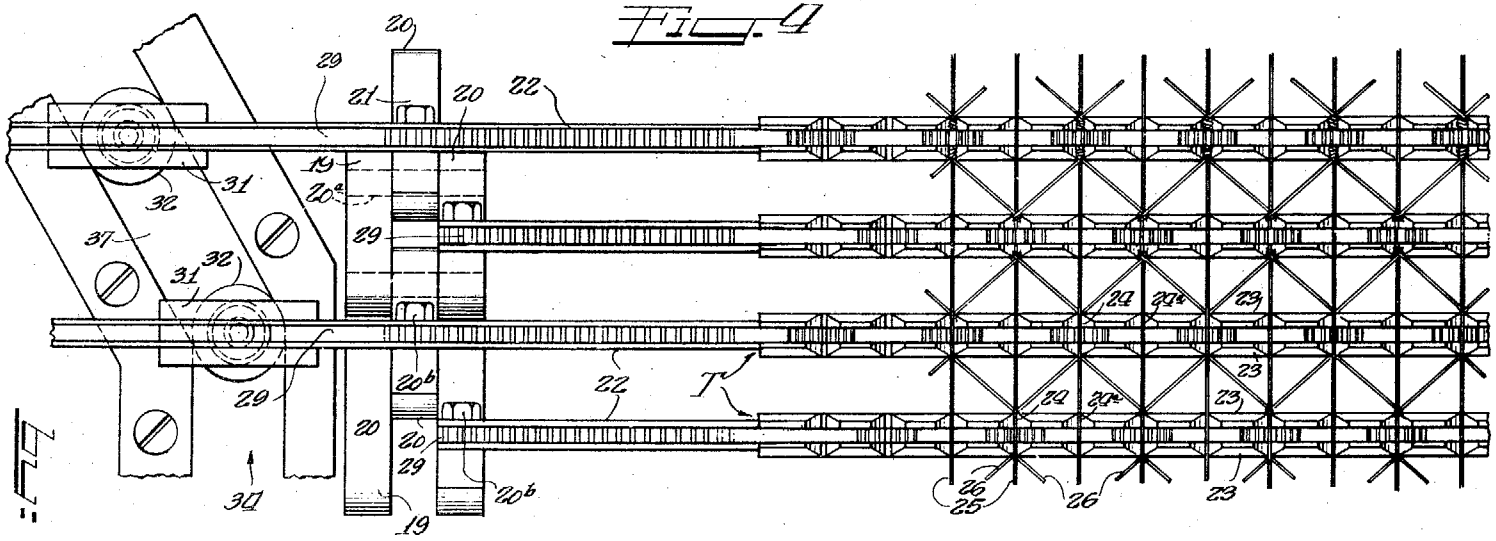
Figure 4 is an enlarged fragmentary plan view showing details of the wire twisting mechanism.
Figure 6:
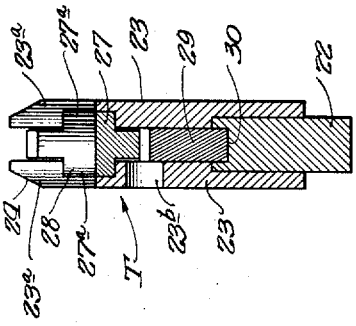
Figure 6 is a sectional view taken approximately in the plane indicated by the line VI—VI in Figure 5.
Figure 5:
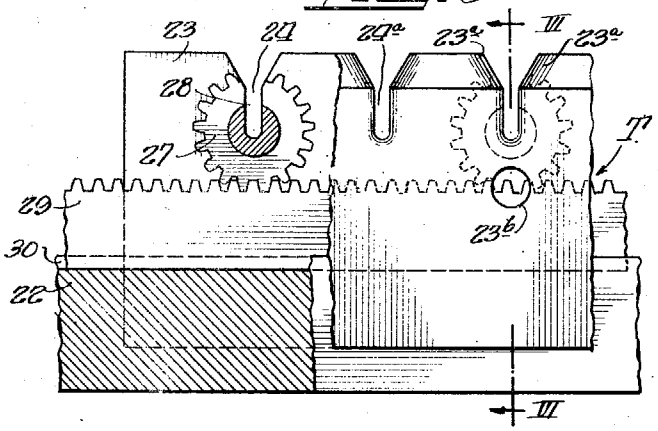
Figure 5 is an enlarged fragmentary elevational view of certain details of the twisting mechanism.
Figure 7:
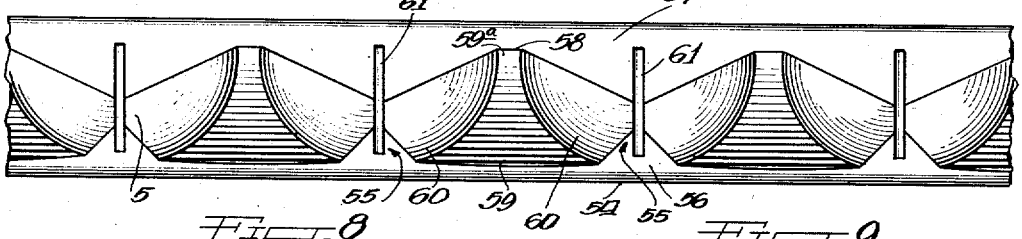
Figure 7 is an enlarged fragmentary plan view showing the formation of the mesh wire weaving or shifting cams or teeth.
Figure 8:
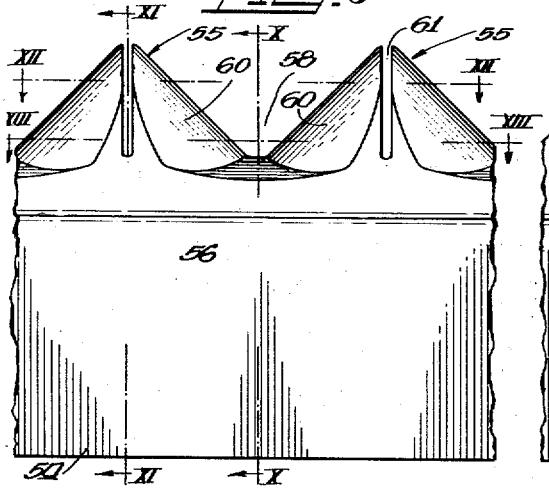
Figure 8 is a fragmentary side elevational view of the same.
Figure 9:
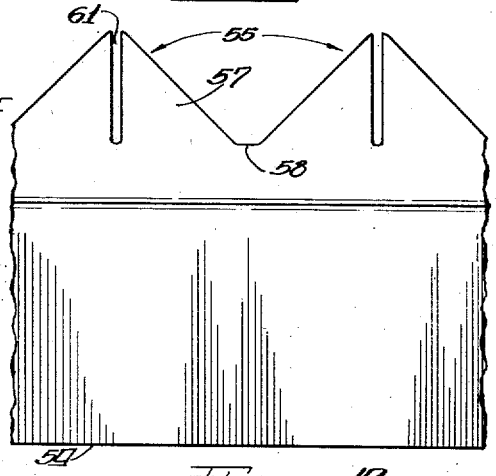
Figure 9 is a similar view of the opposite side of the same.
Figure 10:
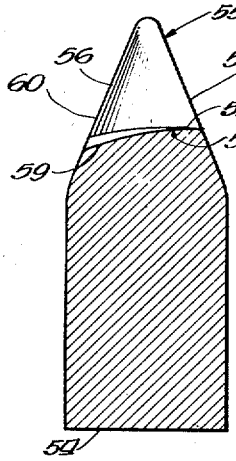
Figure 10 is a sectional view taken approximately in the plane indicated by the line X—X of Figure 8.
Figure 11:
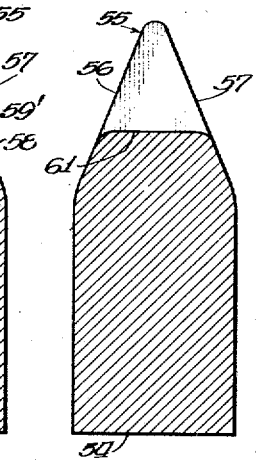
Figure 11 is a sectional view taken approximately in the plane indicated by the line XI—XI of Figure 8.
Figure 12:
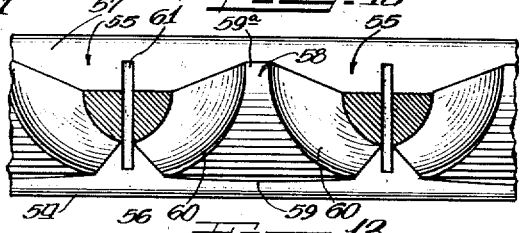
Figure 12 is a top sectional view taken approximately in the plane indicated by the line XII—XII of Figure 8.
Figure 13:
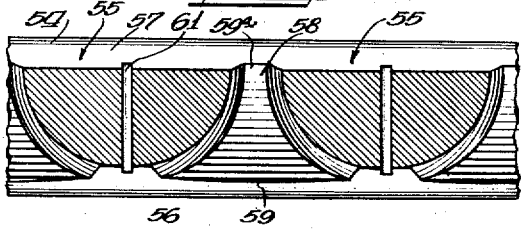
Figure 13 is a similar view taken approximately in the plane indicated by the line XIII—XIII of Figure 8.
Figure 11:
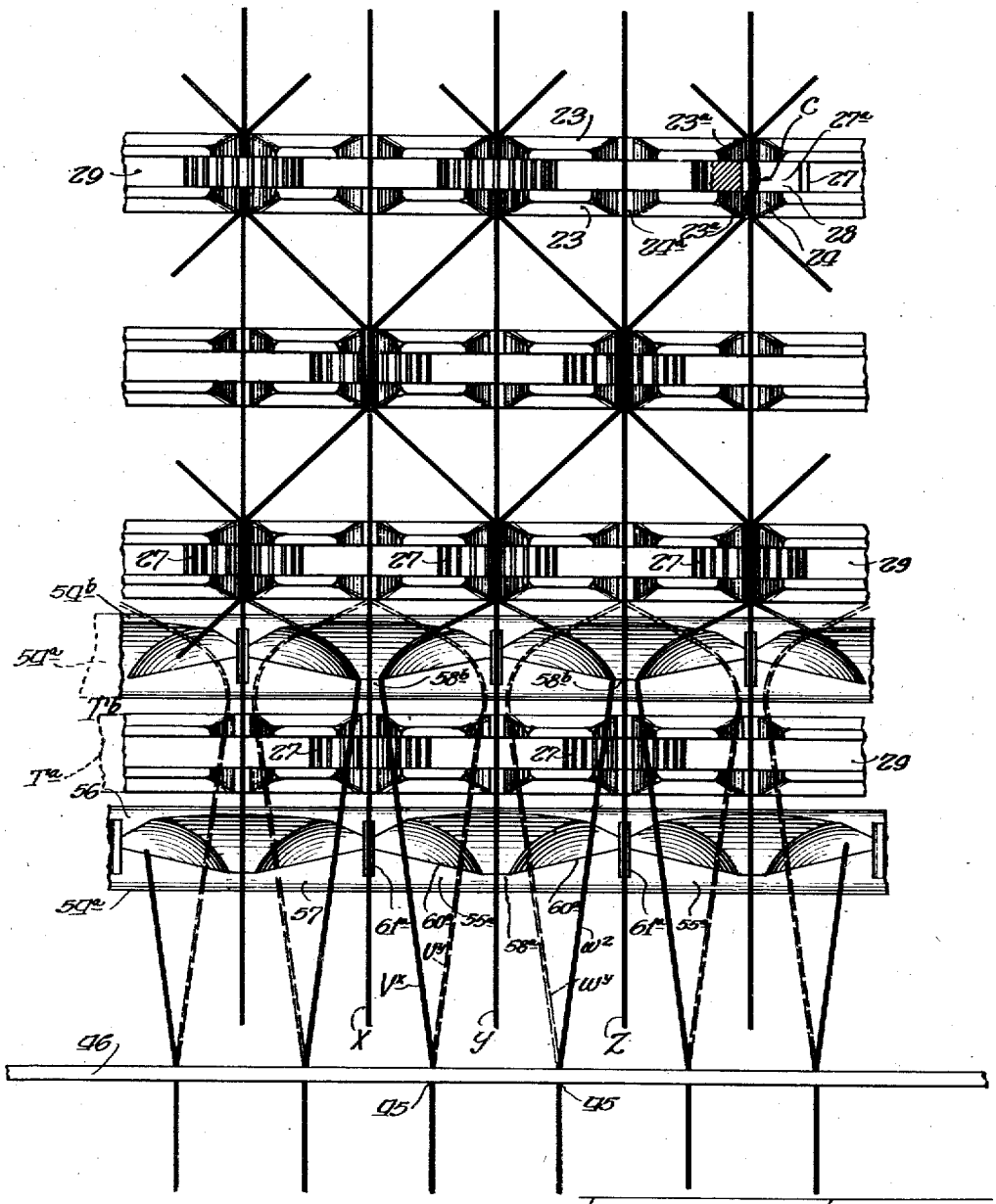

*Transfer of the mesh wires.*—The mesh wires 26 lead from a suitable source (not shown) at the rear of the machine as seen in Figures 1, 3 and 4, pass thru openings 45 which are spaced apart substantially as in the case of the openings 38 for the line wires 25, but staggered with respect thereto as seen in Figures 3 and 14. The openings 45 are provided in a guide bar 46 extending transversely of the machine and pivotally adjustable to various elevations by means of bolts 47 or the like. The adjacent openings 45 are spaced apart, substantially half the distance between adjacent twisting gears or twisters 27, that is, substantially one half the width of mesh to be fabricated, and in the event line wires are used, these will be spaced apart the same distance. The clearance slots 24a for the line wires 25 in the twisting mechanisms T are spaced from the slots 24 the same distance, and it will be clear from the foregoing that the openings 45 are staggered relative to said slots 24 and 24a. The adjustment of the guide bar 46 is provided in order that the guide bar may be properly positioned to insure proper engagement and distribution or shifting of the mesh wires by the cams preceding entry of these wires into the slots of the twisting mechanisms.

Mounted on a shaft 48 above and preferably somewhat to the rear of the rear sprocket shaft 4 of the machine, and driven in the opposite direction by the latter by any suitable instrumentalities as gearing 50 is a distributor head or roll 49. The ends of the shaft 48 are journalled in bearing brackets 51 carried by the side frame members 3.

The illustrated embodiment of distributor head or roll 49 comprises a plurality of discs 52 secured to the shaft 48 and provided with series of aligned circumferentially equally spaced grooves 53 in which distributor bars 54 are received, these bars being bolted as at 56 or otherwise suitably secured to the discs 52.

The outer longitudinal portion of each distributor bar 54 is formed in saw-tooth fashion, the teeth 55 of the two bars on opposite sides thereof being staggered relative thereto. The teeth of the alternate bars are in alignment. The bars are spaced apart in accordance with the spacing apart of the twisting mechanisms T as the latter approach and move beyond the line of centers of the rear sprocket shaft 4 and the distributor head shaft 48 each bar being capable of passing freely down between successive twisting mechanisms and subsequently passing upwardly out of the path of movement of the twisting mechanisms. The parts are therefore so dimensioned that the twisting mechanisms "mesh" with the distributor head bars similar to the manner of gears. By virtue of the driving relationship between the rear sprocket shaft 4 and the distributor head shaft 48, it will be understood that the cooperating twisting mechanisms and the distributor head bars constantly move in the same direction toward the front of the machine.

The toothed portion of each bar has its opposite sides beveled at 56 and 57, and the grooves 58 between adjacent teeth 55 are deepened and their side walls flared from the side 57 toward the side 56, as indicated at 59 and 60 respectively. Because of the flaring of the walls of the grooves, it will be appreciated that each tooth is larger or wider on the side 57 than on the side 56. Each tooth is therefore in effect a cam whose operation will appear more fully as the description proceeds.

The adjacent grooves 58 in each bar 54 are spaced apart a distance equal to the distance between twisters 27 and are arranged to move in the planes of movement of the twisters longitudinally of the machine. Thus the radial planes containing or passing through the centers of the cams on the various bars of the distributor head are arranged in spaced relation to the various twisters 27 in the twisting mechanisms T.

The outermost portion 59′ of the bottom of each groove 58 is so located that when it is disposed substantially on the line of centers of the rear sprocket shaft 4 and distributor head shaft 48, it is spaced from the bottoms of the succeeding twisting mechanisms, in a direction substantially parallel to said line of centers, a distance substantially equal to twice the diameter of the wire employed in making the fabric (see Fig. 1). If line wires are omitted, the portions 59′ will still effectively deposit the mesh wires 26 in the twister slots. In the event the wires 25 and 26 are of different diameters, the distance referred to will be substantially equal to the sum of the diameters of the wires. This will insure proper positioning of the mesh wire 26 in the corresponding slots of the said succeeding twisting mechanism without kinking the wire and will also provide adequate clearance for alternate line wires 25.

Slots 61 arranged centrally of and extending transversely through the cams or teeth 55 are provided to accommodate alternate line wires 25, so that said wires may pass freely, without interference from the bars 54, from twisting mechanism to twisting mechanism as clearly seen in Figure 1. The bottom of each slot 61 is preferably spaced from the bottoms of the cooperating twisting mechanism slots, in a direction substantially parallel to the line of centers of the rear sprocket shaft 4 and the distributor head shaft 48, a distance substantially equal to or greater than the diameter of the line wire 25, in order that adequate clearance may be provided for said wire. The actual shifting of the various mesh wires alternately into staggered twisters 27 of the successive twisting mechanism will be understood more fully upon reference to the diagrammatic showing in Fig. 14, wherein certain of the twisting mechanisms are viewed from above and the cooperating distributor bars up from below, as a glance at Fig. 1, will serve to show. For the purpose of the ensuing description, three successive line wires are designated in Figure 14 respectively X, Y and Z, and the two intermediate mesh wires are designated respectively $V^x$ and $W^z$, the mesh wires issuing as above pointed out from the openings 45 in the guide bar 46. In addition, the two distributor bars shown in Fig. 14 are designated $54^a$ and $54^b$, respectively, and these same designations are applied in Fig. 1 to the same two adjacent bars. It will be noted that the bar $54^a$ in Fig. 1 has just moved into cooperative relation with the mesh wires, and this relationship is clearly shown in Fig. 14, certain of the mesh wires being designated $V^x$ and $W^z$ as explained above. At this point in the operation of the machine, the mesh wires extend in substantially straight lines from the grooves $58^b$ in the preceding distributor bar $54^b$ rearwardly to the guide bar 46. With the continued forward movement of the distributor bar $54^a$, the latter proceeds in its descent, and since the mesh wires are constrained by the guide bar 46 and the forward twisting mechanism $T^b$ to lie in substantially the same horizontal or substantially horizontal plane, the inclined sides $60^a$ of the cams $55^a$ in the bar $54^a$ engage and cam the mesh wires $V^x$ and $W^z$ toward the bottom of the groove $58^a$. This camming action is of course gradual and is not completed until the bar $54^a$ occupies substantially the position shown as occupied by the bar $54^b$, as indicated in dotted lines. In this position of the bar $54^a$, the cooperating twisting mechanism $T^a$ will be positioned as indicated in dotted lines in Fig. 14, and the mesh wires will be positioned as indicated in dotted lines at $V^y$ and $W^y$, respectively, as said wires are about to enter the slots of the bar $T^a$ in which the line wire Y is disposed.

The preceding distributor bar $54^b$ is shown as having already cammed the mesh wires $V^x$ and $W^z$ away from each other into the grooves $58^b$ so that the said mesh wires are about to enter the slots in the twisting mechanism $T^b$ in which the line wires X and Z are disposed.

Due to the staggered relation of the cams $55^a$ and $55^b$ on the succeeding distributor bars $54^a$ and $54^b$, each mesh wire is deflected by said cams in a zigzag fashion as clearly shown in the drawings. It will further be noted that the parts are so dimensioned and arranged that when they occupy the relative positions shown in full lines in Figs. 1 and 14, the various mesh wires which have been shifted their full lateral strokes, as by the cams $55^a$, and subsequently by the cams $55^b$, must be deposited into the cooperating slots of the succeeding twisting mechanisms $T^b$ and $T^a$ respectively.

After the mesh wires are shifted into the various twister slots of the twisting mechanisms, the arrangement of the various wires of the fabric to be produced is as shown in the upper part of Fig. 14, and in other figures of the drawings, whereupon the twisting takes place. It will be noted in the upper right hand portion of Fig. 14 that twisting of the wires deposited in the slots of the uppermost bar in Fig. 14 is in process as indicated at C.

In the event it is desired to produce a plain hexagon netting, consisting entirely of mesh wires, no reorganization whatsoever of any of the structure is required. The line wires 25 are simply omitted, the tensioning and guide rolls at the rear of the machine, the guide member 39, the slots 61 in the distributor bars 54 and the alternate slots in the various twisting mechanisms being idle, and the portions of the mesh wires deposited in the same slots being twisted about each other by the twisting mechanisms.

In the event it is desired to set up a machine of this character which is intended to produce only a plain hexagon wire netting, that is, one consisting entirely of mesh wires, not only may the guide and tensioning rolls and guide bar 39 at the rear of the machine be dispensed with, but so may the slots 61 in the distributor bars 54 and the alternate slots in the twisting mechanisms as above stated.

After the netting has been completely fabricated and has progressed to a point adjacent the pick-up roll 41, the fabric passes about the forward portion of the said roll upwardly about the idler roll 41' and forward to the finishing reel 10, about which the fabric is wound.

It will be seen from the foregoing that in accordance with the present invention the formation of wire netting of either the plain or straight line type is accomplished with a minimum number of movable instrumentalities, thereby greatly reducing the labor and cost of repair, as well as the initial cost of the machine, and which may be employed to produce either type of netting without any reorganization or change whatever in any of the parts of the machine. Moreover, by providing for the escape of chips and the like which might cause the movable parts to jam, I have practically eliminated the possibility of any interruption in the production of the fabric caused by the machine itself. The production of fabric in accordance with the present invention is continuous, so that the machine need be stopped only when it is desired to replace a completely wound finishing reel 10 with a blank reel.

Various parts of the machine may be made adjustable, or may be changed in size or proportion to accommodate wires of various sizes and to produce fabrics of various designs. They may further be varied by changing the spacing of the cams on the distributor bars and the corresponding slots and gears of the twisting mechanisms, by graduating the same or otherwise, whereby a fabric having various sizes of mesh may be produced. It will be observed that the additional slots $24^a$ alternate with the slots 24 in the twister holding plates 23 to provide clearance for the line wires 25, as is true of the slots 61 in the distributor bars 54. The slots $24^a$, as well as the slots 24 and 28, are rounded at their ends to facilitate reception of and avoid roughness in contact with the wires. Moreover, while the escape openings $23^b$ are shown to be located in the forward bar 23 of each twisting mechanism T, they may be provided in the rear plate alone or in both plates if desired.

If desired, twisters may also be arranged in cooperative relation with the slots 24[a], in order that all twisting mechanisms T may be interchangeable. In such event, escape openings 23[b] will of course also be provided in proper relation to the slots and gears.

The rounding or flaring portions 27[a] of the twister slots 28 serve to guide the wires thereinto, even though the slots 28 may for some reason or other be somewhat out of register with the corresponding slots 24 in the twister holding plates 23.

I am aware that many changes may be made and numerous details of construction may be varied through a wide range without departing from the principles of this invention and I therefore do not purpose limiting the patent granted hereon otherwise than necessitated by the scope of the appended claims.

I claim as my invention:

1. In a machine for making wire fabric embodying means for receiving line and mesh wires, additional means movable bodily with respect to said first means for simultaneously feeding line and mesh wires in alternate arrangement into said first means including means for simultaneously deflecting the mesh wires on opposite sides of each line wire toward and away from the line wire, and said first means including instrumentalities for wrapping the deflected portions about the adjacent portions of the line wires, said mesh wires being deflected prior to their introduction into said instrumentalities.

2. In a wire fabric making machine including a movable endless series of twisting mechanisms having slotted twisters in which a pair of line wires of the fabric is carried; a device for feeding a mesh wire in a zigzag fashion by depositing a portion of the same in a twister containing one line wire and the next succeeding portion in the twister of the next succeeding mechanism containing the other line wire, said device comprising oppositely facing cams, and instrumentalities for moving said cams successively against the mesh wire to successively shift said portions in opposite direction into the twisters containing the line wires.

3. In a wire fabric making machine including a movable endless series of twisting mechanisms having slotted twisters in which a pair of line wires of the fabric is carried: a device for feeding a mesh wire in a zigzag fashion by depositing a portion of the same in a twister containing one line wire and the next succeeding portion in the twister of the next succeeding mechanism containing the other line wire, said device comprising oppositely facing cams, and instrumentalities for moving said cams successively against the mesh wire to successively shift said portions in opposite directions into the twisters containing the line wires, each cam, where it leaves the portion deflected, being spaced from the other in the direction in which the mesh wire is deflected, a distance equal substantially to the distance between the line wires.

4. In a fabric making machine of the type wherein each mesh wire is given a substantially zigzag motion for alternate wrapping or twisting about the adjacent line wires: a device for imparting a zigzag motion to each mesh wire between each pair of line wires, said device comprising an endless series of shifting members, each member having a saw tooth formation, the teeth on each member being staggered relative to the teeth on the succeeding and preceding members, and means for feeding the line wires in substantial alignment with the apexes of the teeth and the mesh wires between the line of wires, in substantially the same plane, whereby as said device is moved, the teeth dip into engagement with the mesh wires so that each mesh wire is alternately shifted in opposite directions between the line wires straddling said mesh wire, twisting mechanisms arranged in an endless series for twisting the deflected portions of the mesh wires about the adjacent portions of the line wires, said members being spaced apart substantially the same distance by which the cooperating twisting mechanisms are spaced apart, whereby each member, throughout substantially the period of its cooperation with the mesh wires, is positioned between successive mechanisms.

5. In a wire fabric making machine including a movable endless series of twisting mechanisms having slotted twisters in which a pair of line wires of the fabric are carried: a device for feeding a mesh wire in a zigzag fashion by depositing a portion of the same in a twister containing one line wire and the next succeeding portion in the twister of the next succeeding mechanism containing the other line wire, said device comprising oppositely facing cams, and instrumentalities for moving said cams successively against the mesh wire to successively shift said portions in opposite directions into the twisters containing the line wires, the twisters in successive mechanisms being staggered.

6. In a fabric making machine of the type wherein each mesh wire is given a substantially zigzag motion for alternate wrapping or twisting about the adjacent line wires: a device for imparting a zigzag motion to each mesh wire between each pair of line wires, said device comprising an endless series of shifting members, each member having a saw tooth formation, the teeth on each member being staggered relative to the teeth on the succeeding and preceding members, and means for feeding the line wires in substantial alignment with the apexes of the teeth and the mesh wires between the line wires, in substantially the same plane, whereby as said device is moved, the teeth dip into engagement with the mesh wires so that each mesh wire is alternately shifted in opposite directions between the line wires straddling said mesh wire, twisting mechanisms arranged in an endless series for twisting the deflected portions of the mesh wires about the adjacent portions of the line wires, said members being spaced apart substantially the same distance by which the cooperating twisting mechanisms are spaced apart, whereby each member, throughout substantially the period of its cooperation with the mesh wires, is positioned between successive mechanisms, each twisting mechanism comprising a plurality of twisters arranged in staggered relation to the twisters of the succeeding and preceding mechanisms.

7. In a fabric making machine of the type wherein each mesh wire is given a substantially zigzag motion for alternate wrapping or twisting about the adjacent line wires: a device for imparting a zigzag motion to each mesh wire between each pair of line wires, said device comprising an endless series of shifting members, each member having a saw tooth formation, the teeth on each member being staggered relative to the teeth on the succeeding and preceding members, and means for feeding the line wires in substantial alignment with the apexes of the teeth and the mesh wires between the line wires, in substantially the same plane, whereby as said device is moved, the teeth dip into engagement with the mesh wires so that each mesh wire is alternately shifted in opposite directions between the line wires straddling said mesh wire, twisting mechanisms arranged in an endless series for twisting the deflected portions of the mesh wires about the adjacent portions of the line wires, said members being spaced apart substantially the same distance by which the cooperating twisting mechanisms are spaced apart, whereby each member, throughout substantially the period of its cooperation with the mesh wires, is positioned between successive mechanisms, each twister being directly aligned with the space between adjacent teeth of the next preceding member.

8. In a fabric making machine of the type wherein adjacent mesh wires are simultaneously deflected successively toward and away from each other and the deflected portions twisted about each other, means for twisting the same, said means including a slotted gear, slotted plates in which said gear is journaled, a rack for rotating said gear, each slot of one of said plates and the adjacent portion of the slot of the adjacent gear being flared to guide the deflected portions into said slots, said means having provision affording escape of chips and other foreign matter, whereby clogging or jamming of the twisters is avoided.

9. In a machine for making wire fabric embodying line and mesh wires, means for feeding a plurality of mesh wires, cams engageable with said mesh wires for deflecting juxtaposed portions of the mesh wires on opposite sides of each line wire alternately toward and away from said line wire, means for wrapping the deflected portions about the line wires, and means for varying the angle at which the mesh wires are fed to the cams.

10. In a wire fabric making machine including a movable endless series of twisting mechanisms having slotted twisters in which three line wires of the fabric are carried: a device for feeding two mesh wires between the inner and outer line wires in a substantially zigzag fashion by simultaneously depositing opposed portions of the mesh wires in a twister containing the central line wire and the next succeeding opposed portions in the twisters of the next succeeding mechanism containing the other line wires, said device comprising a movable endless series of successively staggered cams for deflecting successive portions of the mesh wires into alternate twisters, said cams "meshing" with said mechanisms and depositing the mesh wires into the twisters of the next succeeding mechanism.

11. In a machine of the class described, means for feeding a plurality of mesh wires, deflecting means engageable with said wires for deflecting successive portions of adjacent wires alternately toward and away from each other, and means for receiving and wrapping together the portions deflected toward each other, said last means comprising a rack, a pinion rotatable by said rack, means straddling and supporting said pinion, said pinion supporting means and said pinion having wire-receiving slots adapted to register, the walls of the pinion slot adjacent one of the slots of said means being transversely flared to guide the wire thereinto even when the pinion slot is partly out of register with the other slot, said deflecting means being movable relative to the pinion supporting means.

12. Mechanism of the class described, comprising a rack, a pinion rotatable by said rack, means straddling and supporting said pinion, said means and said pinion having wire-receiving slots adapted to register, the walls of the pinion slot adjacent one of the slots of said means being flared transversely of the slot to guide the wire thereinto even when the pinion slot is partly out of register with the other slot, and means movable with respect to said pinion supporting means for feeding and deflecting wire into the registered slots of said pinion and said pinion supporting means.

13. In a fabric making machine of the type wherein adjacent mesh wires are simultaneously deflected successively toward and away from each other and the deflected portions twisted about each other, a means for feeding a plurality of mesh wires, deflecting means engageable with said wires for deflecting juxtaposed portions of adjacent wires alternately toward and away from each other, and means for twisting together the portions of said wires which have been deflected to positions opposite each other, said last means including a slotted gear, slotted plates in which said gear is journaled, a rack for rotating said gear, the slot of one of said plates and the adjacent portion of the slot of the gear having transversely convex walls to guide the deflected portions into said slot.

14. Mechanism of the class described, comprising a rack, a pinion rotatable by said rack, means straddling and supporting said pinion, said means and said pinion having wire-receiving slots adapted to register, the walls of the pinion slots adjacent one of the slots of said means being flared transversely of the slot to guide the wire thereinto even when the pinion slot is partly out of register with the other slot, said flaring being provided by an enlargement in the mouth of the pinion slot, and means movable with respect to said pinion supporting means for feeding the wire into the registered slots of said pinion and said pinion supporting means.

ISRAEL C. GELLMAN.